United States Patent
Matsunaga

(10) Patent No.: US 8,078,414 B2
(45) Date of Patent: Dec. 13, 2011

(54) WATER LEVEL MEASURING APPARATUS AND MEASURING METHOD

(75) Inventor: Hideki Matsunaga, Ageo (JP)

(73) Assignee: Nissan Diesel Motor Co., Ltd., Ageo-Shi, Saitama (JP)

( * ) Notice: Subject to any disclaimer, the term of this patent is extended or adjusted under 35 U.S.C. 154(b) by 287 days.

(21) Appl. No.: 12/410,396

(22) Filed: Mar. 24, 2009

(65) Prior Publication Data

US 2009/0182516 A1    Jul. 16, 2009

Related U.S. Application Data

(63) Continuation of application No. PCT/JP2007/063210, filed on Jul. 2, 2007.

(30) Foreign Application Priority Data

Sep. 26, 2006  (JP) .................................. 2006-261080

(51) Int. Cl.
*G01F 17/00*    (2006.01)

(52) U.S. Cl. ........................................................ 702/55

(58) Field of Classification Search .................... 702/55
See application file for complete search history.

(56) References Cited

U.S. PATENT DOCUMENTS

| | | | | |
|---|---|---|---|---|
| 4,912,646 A | * | 3/1990 | Cerruti ............................. | 702/55 |
| 5,394,344 A | * | 2/1995 | Lippmann et al. .............. | 702/50 |
| 2001/0032506 A1 | | 10/2001 | Keller | |

FOREIGN PATENT DOCUMENTS

| | | |
|---|---|---|
| JP | 4-285820 A | 10/1992 |
| JP | 10-245016 A | 9/1998 |
| JP | 11-311561 A | 11/1999 |
| JP | 2006-170927 A | 6/2006 |

* cited by examiner

*Primary Examiner* — Aditya Bhat
(74) *Attorney, Agent, or Firm* — McDermott Will & Emery LLP

(57) ABSTRACT

A water level measuring apparatus and a water level measuring method, in which a water level $L_0$ of a liquid is read from a water level indicator secured to a liquid tank, and a filter value FLT is calculated by applying a filter with a time constant greater than one second to the water level $L_0$. Furthermore when the filter value FLT is less than a minimum value Min, the minimum value Min is sequentially updated with the filter value FLT. Then the minimum value Min is output as the final water level L. Accordingly, even if the surface sloshes and the water level $L_0$ fluctuates up and down, by adopting the minimum value that utilizes the characteristic of the surface fluctuations, as the final water level L, there is little influence of the liquid sloshing, and the water level measurement accuracy can be improved.

6 Claims, 4 Drawing Sheets

WATER LEVEL MEASURING APPARATUS AND MEASURING METHOD

This application is a continuation of PCT/JP2007/063210, filed on Jul. 2, 2007.

FIELD

The present invention relates to a technique for measuring a water level highly accurately, even if sloshing occurs in a liquid stored in a liquid tank.

BACKGROUND

As a water level measuring apparatus that measures the water level of a liquid stored in a liquid tank, there has been proposed a technique for indirectly measuring the water level based on a change in an interelectrode capacitance of a pair of electrodes arranged with a predetermined gap therebetween, as disclosed in Japanese Laid-open (Kokai) Patent Application Publication No. H11(1999)-311561 (Patent Document 1). Moreover, as a water level measuring apparatus that measures the water level by using another principle, there has been proposed a technique for directly measuring the water level based on a position of a float floating on a water surface, as disclosed in Japanese Laid-open (Kokai) Patent Application Publication No. 2006-170927 (Patent Document 2).

CITATION LIST

Patent Literature

[Patent Document 1] Japanese Laid-open (Kokai) Patent Application Publication No. H11(1999)-311561
[Patent Document 2] Japanese Laid-open (Kokai) Patent Application Publication No. 2006-170927

SUMMARY

Technical Problem

However, in the conventionally proposed water level measuring apparatus, when the surface is stable, the water level can be accurately measured, but when the surface is sloshing, the water level fluctuates up and down, and it is very difficult to determine which fluctuating value should be adopted as the water level. Particularly, when the water level of a liquid such as fuel carried in a moving vehicle is to be measured, multi-directional acceleration acts on the liquid so that the surface sloshes irregularly, and hence this undesirable situation may appear noticeably.

Therefore, in view of the conventional problem described above, it is an object of the present invention to provide a water level measuring apparatus and a water level measuring method (hereinafter, referred to as a "water level measuring technique"), in which a minimum value of a filter value obtained by applying a filter with a time constant greater than one second to a water level measured by a water level indicator is adopted as a final water level, to thereby use the characteristics of the surface fluctuations, so that there is little influence of the liquid sloshing.

Solution to Problem

Therefore the water level measuring technique of the present invention is characterized in that, one of an electronic circuit, a computer, and a control unit having the computer built therein, while calculating a filter value by applying a filter with a time constant greater than one second to a water level signal from a water level indicator that measures the water level of a liquid stored in a liquid tank, retains a minimum value of the filter value, and outputs the minimum value as a water level.

Advantageous Effects of Invention

According to the water level measuring technique of the present invention, a minimum value of a filter value obtained by applying a filter with a time constant greater than one second to the water level measured by the water level indicator, is output as a final water level. That is to say, there is a characteristic that when the liquid sloshes due to vibrations or the like, the surface sways a lot in upwards but not much in downwards. Therefore, considering that the actual water level of the liquid stored in the liquid tank gradually drops as the liquid is consumed, the actual water level becomes close to the minimum value of the filter value obtained by applying a filter to the water level measured by the water level indicator. Consequently, by adopting the minimum value as the final water level, there is little influence of the liquid sloshing, and the water level measurement accuracy can be improved.

As used herein, the term "water level" is broadly defined to encompass the level of liquid such as liquid stored in a liquid tank.

DESCRIPTION OF EMBODIMENTS

Hereunder is a detailed description of the present invention, with reference to the accompanying drawings.

Figure 1:
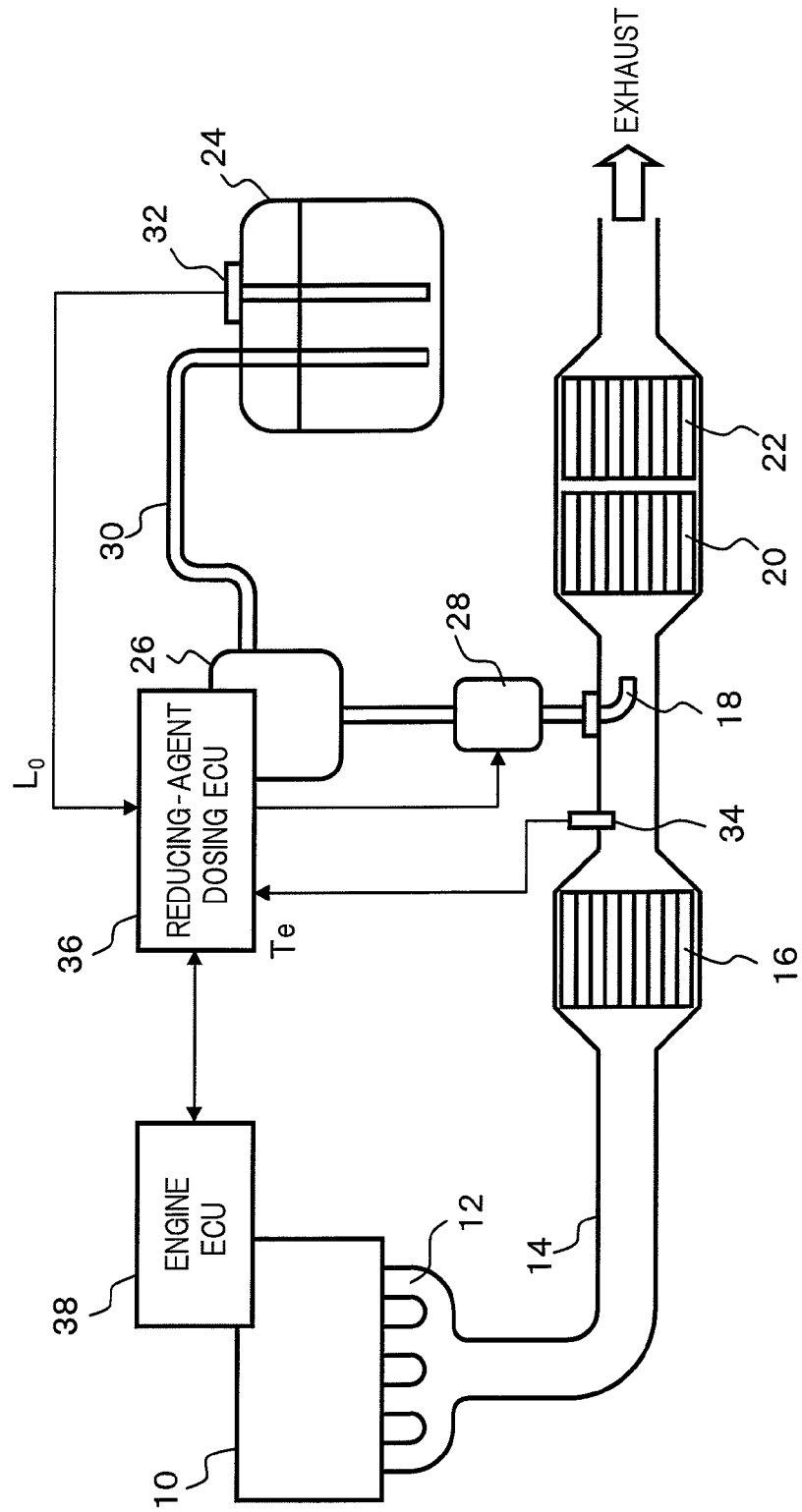
FIG. 1 is an overall configuration view of an exhaust emission purifying device to which the present invention is applied.

FIG. 1 shows an overall configuration of an exhaust emission purifying device to which the present invention is applied.

In an exhaust pipe 14 connected to an exhaust manifold 12 of an engine 10, there are respectively arranged along an exhaust emission flow direction in this order; a nitrogen oxidation catalyst 16 for oxidizing nitrogen monoxide (NO) to nitrogen dioxide ($NO_2$), an injection nozzle 18 for injecting and supplying an urea aqueous solution as a precursor of a reducing agent, a NOx reducing catalyst 20 for reducing and purifying nitrogen oxide (NOx) by using ammonium obtained by hydrolyzing the urea aqueous solution, and an ammonium oxidation catalyst 22 for oxidizing the ammonium that has passed through the NOx reducing catalyst 20.

Urea aqueous solution stored in a reducing agent tank 24 (liquid tank) is supplied to the injection nozzle 18 via a supply pipe 30 having a suction port opened at a bottom of the reducing agent tank 24. Further, on the supply pipe 30, there are installed a pump module 26 for sucking and force feeding the urea aqueous solution, and a dosing module 28 for controlling an injection flow rate of the urea aqueous solution. Moreover, a water level indicator 32 for measuring the water level $L_0$ of the urea aqueous solution, is secured to the reducing agent tank 24. For the water level indicator 32, an internal electrode and an external electrode having an annular cross-section are suspended concentrically from a ceiling wall toward a bottom wall of the reducing agent tank 24, and the water level indicator 32 indirectly measures the water level $L_0$ based on a change in the interelectrode capacitance of the both electrodes. Incidentally, the water level indicator 32 is not limited to one for measuring the water level $L_0$ based on the capacitance, and for example, various known water level indicators such as a floating type and an optical type can be used.

On the other hand, an exhaust temperature sensor 34 for measuring exhaust temperature Te is positioned in the exhaust pipe 14 between the nitrogen oxidation catalyst 16 and the injection nozzle 18. Respective output signals from the water level indicator 32 and the exhaust temperature sensor 34 are input to a reducing-agent dosing control unit (hereinafter referred to as a "reducing-agent dosing ECU") 36 having a computer built therein. Moreover engine operating conditions such as the engine rotating speed and the load of the engine are input from an engine control unit (hereinafter referred to as an "engine ECU") 38 that performs various controls of the engine 10, to the reducing-agent dosing ECU 36 via a network such as a controller area network (CAN). Furthermore the reducing-agent dosing ECU 36 executes a control program stored in a read only memory (ROM) or the like, to electronically control the pump module 26 and the dosing module 28, and realize various functions for measuring the water level L of the urea aqueous solution, respectively. At this time, the reducing-agent dosing ECU 36 calculates a control value representing the injection flow rate of the urea aqueous solution, based on the engine operating conditions including the exhaust temperature Te, for each predetermined time period.

In such an exhaust emission purifying device, the urea aqueous solution injected and supplied from the injection nozzle 18 according to the engine operating conditions, is hydrolyzed by exhaust heat and water vapor in the exhaust, and converted to ammonium. It is known that the converted ammonium causes a reduction reaction with the NOx in the exhaust in the NOx reducing catalyst 20, and is then converted to water ($H_2O$) and nitrogen ($N_2$). At this time, the NO is oxidized to $NO_2$ by the nitrogen oxidation catalyst 16 in order to increase the NOx purifying capability of the NOx reducing catalyst 20, and a ratio between NO and $NO_2$ in the exhaust is improved to a ratio suitable for the reduction reaction. On the other hand, the ammonium that has passed through the NOx reducing catalyst 20 is oxidized by the ammonium oxidation catalyst 22 arranged on the exhaust emission stream downstream of the NOx reducing catalyst 20, thereby preventing the ammonium from being directly discharged into the air.

Figure 2:
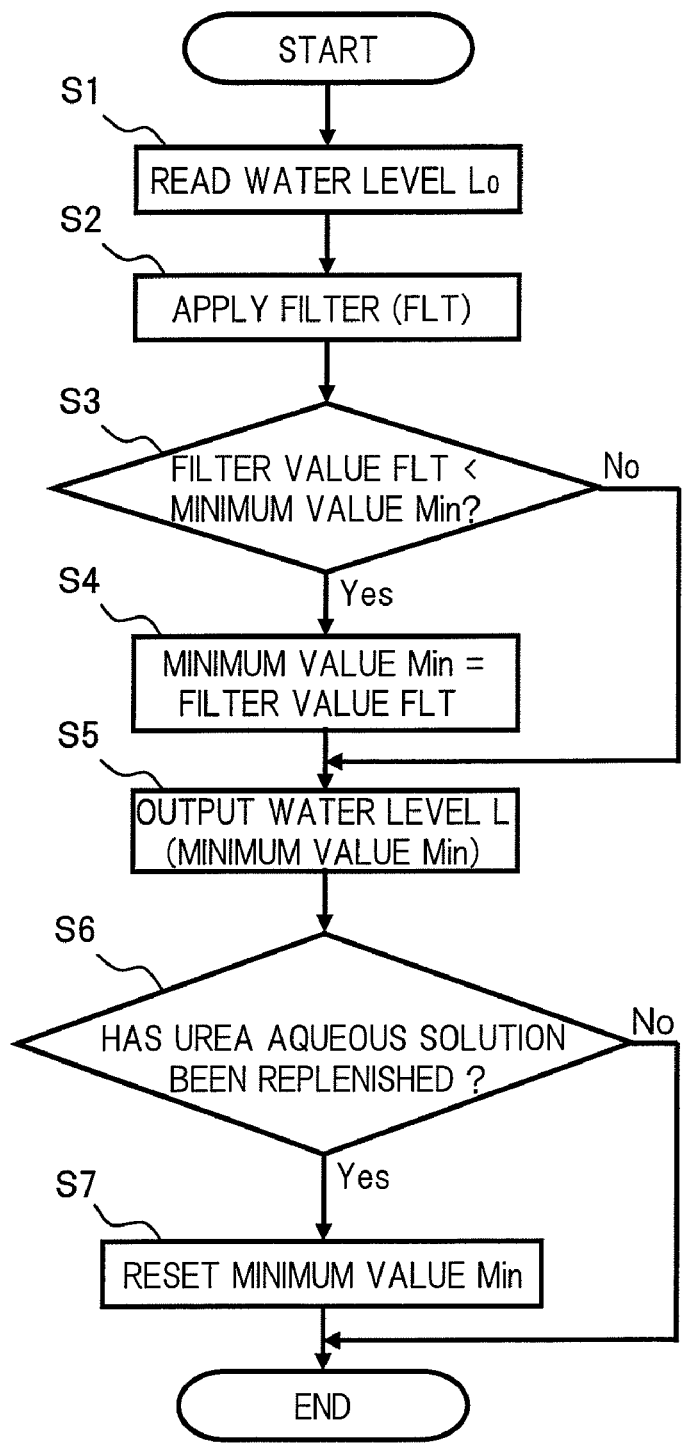
FIG. 2 is a flowchart indicating the processing contents of a control program.

FIG. 2 shows a control program that is executed repeatedly for each predetermined time period, by the reducing-agent dosing ECU 36. Incidentally, when the reducing agent tank 24 is replenished with the urea aqueous solution, a minimum value Min as a variable is set (reset) to, for example, a maximum value corresponding to the tank volume. In this case, whether or not the urea aqueous solution has been replenished can be determined by whether or not a condition where a filter value obtained by applying a filter with a time constant greater than one second (for example several tens of seconds) to the water level $L_0$ measured by the water level indicator 32, has risen to a predetermined value or more, has continued for a predetermined time or more.

In step 1 (abbreviated to "S1" in the figure, and similarly hereunder), the water level $L_0$ is read from the water level indicator 32.

In step 2, a filter value FLT is calculated by applying the filter with a time constant greater than one second (for example several tens of seconds) to the water level $L_0$.

In step 3, it is determined whether or not the filter value FLT is less than the minimum value Min. Then if the filter value FLT is less than the minimum value Min, the routine proceeds to step 4 (Yes), and the minimum value Min is updated with the filter value FLT. On the other hand, if the filter value FLT is not less than the minimum value Min, the routine proceeds to step 5 (No).

In step 5, the minimum value Min is output as the final water level L.

In step 6, by the above determination method, it is determined whether or not the urea aqueous solution has been replenished. Then if the urea aqueous solution has been replenished, the routine proceeds to step 7 (Yes), and the minimum value Min is reset. On the other hand, if the urea aqueous solution has not been replenished, the processing is terminated (No).

According to such a water level measuring apparatus, the filter value FLT is calculated by applying a filter with a time constant greater than one second to the water level $L_0$ measured by the water level indicator 32. Then if the filter value FLT is less than the minimum value Min, the minimum value Min is updated with the filter value FLT. Subsequently, the minimum value Min is output as the final water level L.

Figure 3:
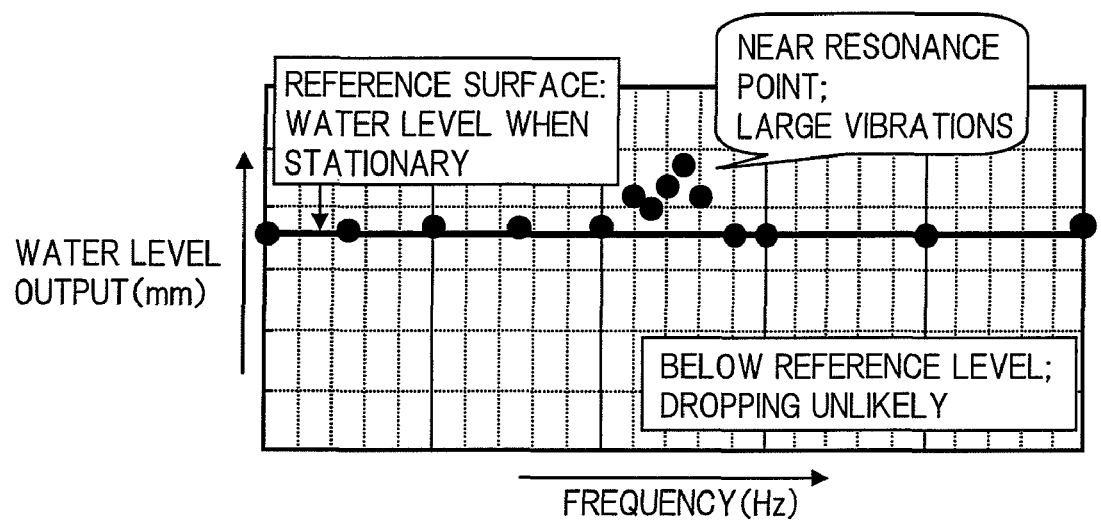
FIG. 3 is an explanatory drawing of surface sloshing characteristics.
Figure 4:
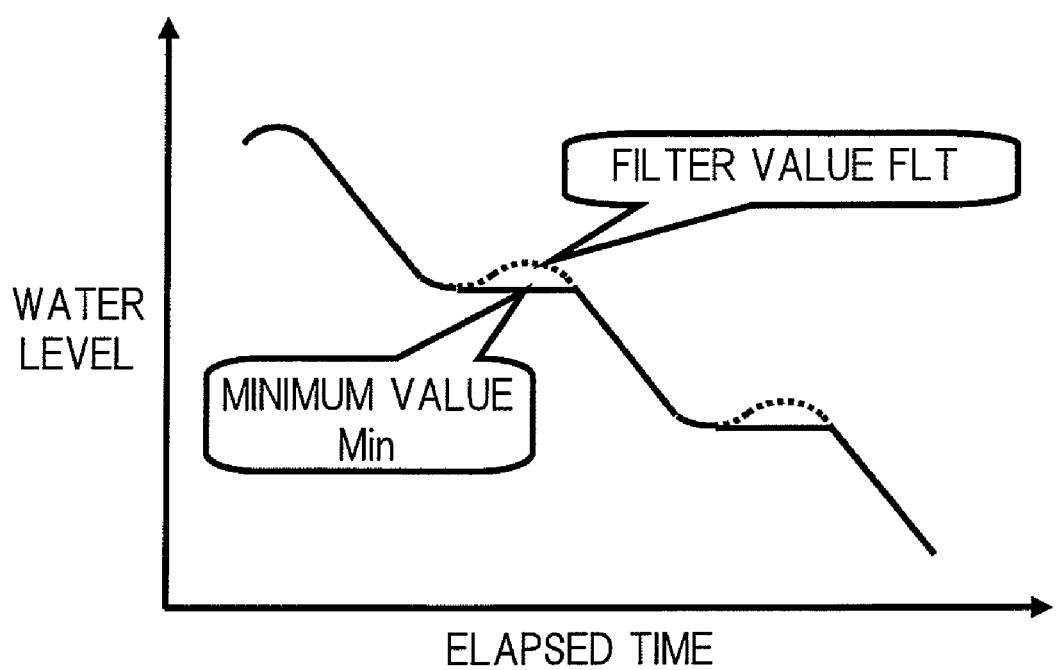
FIG. 4 is an explanatory drawing of a minimum value specifying method.

That is to say, when the urea aqueous solution sloshes due to vibrations or the like, there is a characteristic as shown in FIG. 3, where the surface sways a lot in upwards but not much in downwards. Therefore, considering that the actual water level of the urea aqueous solution stored in the reducing agent tank 24 gradually drops as the urea aqueous solution is consumed, as shown by a solid line in FIG. 4, the actual water level becomes close to the minimum value Min of the filter value FLT obtained by applying the filter to the water level $L_0$ measured by the water level indicator 32. Consequently, by adopting the minimum value Min as the final water level L, there is little influence of the liquid sloshing, and the water level measurement accuracy can be improved.

Incidentally, the present invention is not limited to the exhaust emission purifying device, and is also applicable to measurement of, for example, the water level of fuel stored in a fuel tank, and the water level of a chemical used in a chemical processing plant. In these cases, the control program can be executed by a computer or various control units having the computer built therein, instead of by the reducing-agent dosing ECU 36.

Moreover, the processing where, while a filter value is calculated by applying the filter with a time constant greater than one second to the water level $L_0$, the minimum value of the filter value is retained, can be performed not only by software processing by the control program, but also by hardware processing using a known electronic circuit comprising an RC circuit, an RL circuit, a latching circuit, and the like.

It should be appreciated that the entire contents of Japanese Patent Application No. 2006-261080, filed on Sep. 26, 2006, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

REFERENCE SIGNS LIST

24 Reducing agent tank
32 Water level indicator
36 Reducing-agent dosing ECU

What is claimed is:

1. A water level measuring apparatus comprising:
a water level indicator configured to measure a water level of a liquid stored in a liquid tank; and
one of a computer and a control unit having the computer built therein,
wherein the one of the computer and the control unit is configured to retain a minimum value of a filter value while calculating the filter value by applying a filter with a time constant greater than one second to the water level measured by the water level indicator, and is configured to output the minimum value as a water level.

2. A water level measuring apparatus according to claim 1, wherein the one of the computer and the control unit is configured to sequentially update the minimum value with the filter value when the filter value is less than the minimum value.

3. A water level measuring apparatus according to claim 2, wherein the one of the computer and the control unit is configured to reset the minimum value when it is determined that the liquid tank has been replenished with the liquid.

4. A water level measuring apparatus according to claim 3, wherein the one of the computer and the control unit is configured to determine that the liquid tank has been replenished with the liquid when a condition where the filter value obtained by applying the filter with a time constant greater than one second to the water level measured by the water level indicator, has risen to a predetermined value or more, has continued for a predetermined time or more.

5. A water level measuring apparatus comprising:
a water level indicator configured to measure a water level of a liquid stored in a liquid tank; and
an electronic circuit configured to retain a minimum value of a filter value while calculating the filter value by applying a filter with a time constant greater than one second to the water level measured by the water level indicator, and is configured to output the minimum value as a water level.

6. A water level measuring method, which is performed by one of an electronic circuit, a computer, and a control unit having the computer built therein, comprising the steps of:
while calculating a filter value by applying a filter with a time constant greater than one second to a water level signal from a water level indicator that measures a water level of a liquid stored in a liquid tank, retaining a minimum value of the filter value; and
outputting the minimum value as a water level.

\* \* \* \* \*